(12) United States Patent
Ooguchi et al.

(10) Patent No.: US 9,189,154 B2
(45) Date of Patent: Nov. 17, 2015

(54) INFORMATION PROCESSING APPARATUS, INFORMATION PROCESSING METHOD, AND PROGRAM

(75) Inventors: Nobuhiko Ooguchi, Tokyo (JP); Satoshi Asai, Saitama (JP)

(73) Assignee: Sony Corporation, Tokyo (JP)

(*) Notice: Subject to any disclaimer, the term of this patent is extended or adjusted under 35 U.S.C. 154(b) by 470 days.

(21) Appl. No.: 13/064,957

(22) Filed: Apr. 28, 2011

(65) Prior Publication Data

US 2011/0302534 A1 Dec. 8, 2011

(30) Foreign Application Priority Data

Jun. 8, 2010 (JP) .................................. 2010-131349

(51) Int. Cl.
*G06F 3/048* (2013.01)
*G06F 3/0488* (2013.01)

(52) U.S. Cl.
CPC ........ *G06F 3/04886* (2013.01); *G06F 3/04883* (2013.01)

(58) Field of Classification Search
CPC ...................................................... G06F 3/048
USPC ........................................................ 715/830
See application file for complete search history.

(56) References Cited

U.S. PATENT DOCUMENTS

| 836,958 | A | * | 11/1906 | Zavitae et al. | ................ | 446/261 |
|---|---|---|---|---|---|---|
| 7,161,691 | B2 | * | 1/2007 | Nakagiri et al. | ............. | 358/1.13 |
| 2007/0198476 | A1 | * | 8/2007 | Farago et al. | ..................... | 707/3 |
| 2007/0220431 | A1 | * | 9/2007 | Nakamura et al. | ............ | 715/716 |
| 2008/0165141 | A1 | * | 7/2008 | Christie | ........................ | 345/173 |
| 2009/0077497 | A1 | * | 3/2009 | Cho et al. | ...................... | 715/814 |
| 2009/0148064 | A1 | * | 6/2009 | Schulz | .......................... | 382/284 |
| 2009/0276726 | A1 | * | 11/2009 | Allen et al. | .................. | 715/784 |

FOREIGN PATENT DOCUMENTS

JP 2005-182487 7/2005

* cited by examiner

*Primary Examiner* — Peiyong Weng
(74) *Attorney, Agent, or Firm* — Michael Best & Friedrich LLP

(57) ABSTRACT

There is provided an information processing apparatus including a display unit for arranging and displaying the plurality of items in a guide region, the display unit enlarging a series of items included in a specified range specified in the guide region to a size larger than a size of the items displayed in the guide region and displaying the series of items in one line in a selection region in the predetermined arrangement, a display control unit when a scroll gesture is given to scroll the series of items in the selection region, the display control unit controls the display unit to update display of the guide region so that the series of items displayed in the scrolled selection region is included in the specified range, and a control unit for determining selection of an item in accordance with a selection gesture given in the selection region.

17 Claims, 11 Drawing Sheets

INFORMATION PROCESSING APPARATUS, INFORMATION PROCESSING METHOD, AND PROGRAM

BACKGROUND

The present disclosure relates to an information processing apparatus, an information processing method, and a program.

An information processing apparatus having a small touch panel display such as a portable information terminal and an electronic apparatus allows a user to select characters, images, and the like on a panel surface. For example, when a user inputs characters on the panel surface, the user selects desired characters using a software keyboard displayed on the panel surface in a QWERTY layout and the like.

However, the software keyboard displayed on the small touch panel display has small indications of keys. This makes it difficult for a user to find and type the keys.

For example, Japanese Patent Application Laid-Open No. 2005-182487 discloses a character input device which allows a user to easily input characters with a small virtual keyboard. For example, when a position of a Japanese letter "hi" is tapped on the virtual keyboard including Japanese Hiragana letters arranged in the order of the 50-character Hiragana syllabary, the character input device displays an enlarged key showing "hi" on the panel surface. Around the enlarged key "hi", Japanese letters "chi", "na", "ni", "nu", "ha", "hi", "hu", and the like located within a certain range from the key "hi" on the virtual keyboard are displayed as adjacent enlarged keys.

SUMMARY

However, the character input device disclosed in Japanese Patent Application Laid-Open No. 2005-182487 may not change the display of the enlarged key and the adjacent enlarged keys unless a user operates the virtual keyboard showing Japanese Hiragana letters arranged in the order of the 50-character Hiragana syllabary. Therefore, the user has to repeatedly operate the virtual keyboard, in which it is difficult to find the keys, until a desired key is displayed as the enlarged key or the adjacent enlarged key, which reduces the ease of selection operation (character input operation).

Accordingly, the present disclosure provides an information processing apparatus, an information processing method, and a program capable of improving the ease of operation when selection gesture is given using a small touch panel display.

According to an embodiment of the present disclosure, there is provided an information processing apparatus including a display unit for arranging a plurality of items having a predetermined arrangement in the predetermined arrangement and displaying the plurality of items in a guide region, the display unit enlarging a series of items included in a specified range specified in the guide region to a size larger than a size of the items displayed in the guide region and displaying the series of items in one line in a selection region in the predetermined arrangement, a display control unit, wherein when a move gesture is given to move the specified range in the guide region, the display control unit controls the display unit to display the series of items included in the moved specified range in such a manner that the series of items is displayed in one line in the predetermined arrangement in the selection region, and when a scroll gesture is given to scroll the series of items in the selection region, the display control unit controls the display unit to update display of the guide region so that the series of items displayed in the scrolled selection region is included in the specified range, and a control unit for determining selection of an item in accordance with a selection gesture given in the selection region.

The guide region and the selection region may be arranged so that the move gesture in the guide region and the selection gesture in the selection region can be given with one hand.

The move gesture given in the guide region may be treated as the scroll gesture.

According to another embodiment of the present disclosure, there is provided an information processing method including arranging a plurality of items having a predetermined arrangement in the predetermined arrangement and displaying the plurality of items in a guide region, and enlarging a series of items included in a specified range specified in the guide region to a size larger than a size of the items displayed in the guide region and displaying the series of items in one line in a selection region in the predetermined arrangement, when a move gesture is given to move the specified range in the guide region, displaying the series of items included in the moved specified range in such a manner that the series of items is displayed in one line in the predetermined arrangement in the selection region, and when a scroll gesture is given to scroll the series of items in the selection region, updating display of the guide region so that the series of items displayed in the scrolled selection region is included in the specified range, and determining selection of an item in accordance with a selection gesture given in the selection region.

According to another embodiment of the present disclosure, there is provided a program for causing a computer to execute the information processing method according.

In light of the foregoing, it is desirable to provide an information processing apparatus, an information processing method, and a program capable of improving the ease of operation when selection gesture is given using a small touch panel display.

DETAILED DESCRIPTION OF THE EMBODIMENT

[1. Configuration of Portable Information Terminal 1]

First, a configuration of a portable information terminal 1 according to an embodiment of the present disclosure will be explained with reference to FIGS. 1 and 2. In the following explanation, the portable information terminal 1 will be explained as an example of an information processing apparatus having a small touch panel display 3. Likewise, electronic apparatuses such as an audio apparatus and a home electronic appliance having the small touch panel display 3 can also be explained in the same manner.

Figure 1:
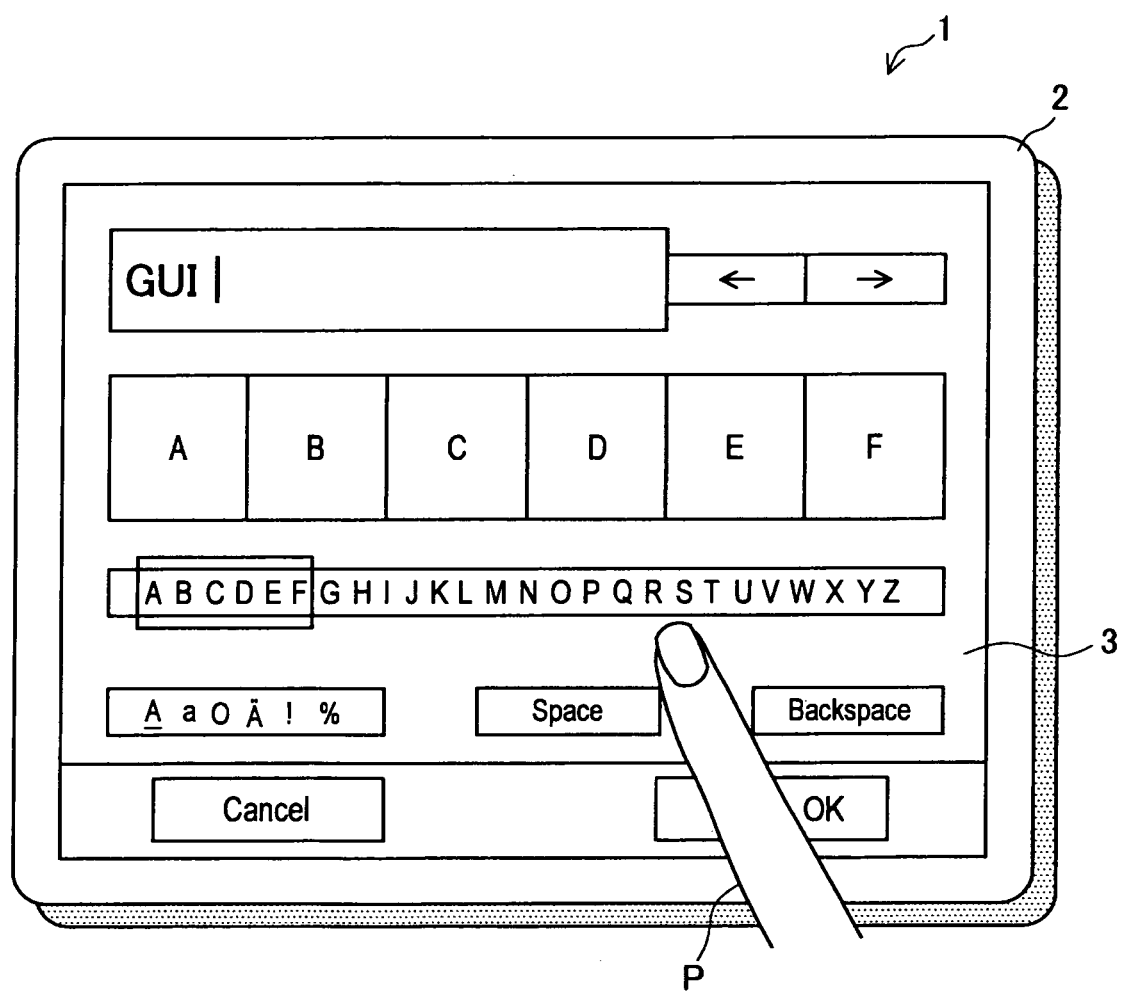
FIG. 1 is an figure illustrating an external appearance of a portable information terminal according to an embodiment of the present disclosure.

FIG. 1 illustrates an external appearance of the portable information terminal 1 according to the embodiment of the present disclosure. As shown in FIG. 1, the portable information terminal 1 includes a card-shaped casing body 2 and a touch panel display 3 arranged on a surface of the casing body 2.

The panel surface of the touch panel display 3 displays GUIs for character input, image selection, and the like, which will be explained later. In FIG. 1, a character input GUI is displayed on the panel surface, which will be explained later in detail. The touch panel display 3 detects scroll gesture, tap gesture, and the like given on the panel surface. The portable information terminal 1 may have hardware buttons for performing predetermined operations such as an activation button and cursor buttons, which are not shown.

Figure 2:
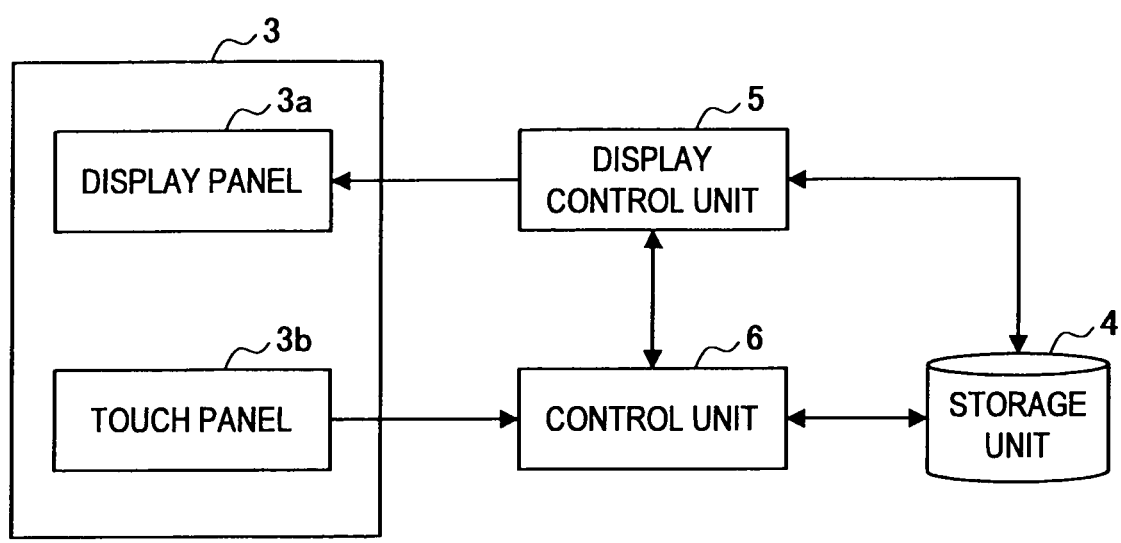
FIG. 2 is a block diagram illustrating a main functional configuration of the portable information terminal.

FIG. 2 illustrates a main functional configuration of the portable information terminal 1. As shown in FIG. 2, the portable information terminal 1 includes the touch panel display 3, a storage unit 4, a display control unit 5, and a control unit 6.

The touch panel display 3 is made by stacking a touch panel 3b on a display panel 3a (display unit). The touch panel 3b may be a panel using a resistive film method, an electrostatic method, an ultrasonic method, an infrared method, and the like. A liquid crystal display (LCD) or the like is used as the display panel 3a.

The touch panel 3b detects the state of contact of a pointer made of a finger P, a stylus, and the like with respect to a panel surface. The touch panel 3b provides a contact signal/release signal to the control unit 6 in accordance with change of contact/non-contact state of the pointer P with respect to the panel surface. While the pointer P is in contact with the panel surface, the touch panel 3b provides an X,Y coordinate signal corresponding to the contact position to the control unit 6. As a result, scroll gesture and tap gesture given on the panel surface are detected.

The storage unit 4 may be a non-volatile memory such as EEPROM, or may be a storage device such as a hard disk drive. The storage unit 4 stores a plurality of items having a predetermined arrangement such as character strings and image sequences. In addition, the storage unit 4 stores display data and the like for character input and/or image selection GUIs.

The display control unit 5 reads GUI display data from the storage unit 4, and performs predetermined processing on the display data in order to display the display data on the display panel 3a.

The control unit 6 includes a CPU, a RAM, a ROM, and the like. The CPU uses a RAM as a work area, and executes programs stored in the ROM, thereby performing calculation processing for operation of the portable information terminal 1 and controlling each unit in the portable information terminal 1. The control unit 6 generates coordinate data by decoding the coordinate signal provided from the touch panel 3b, and controls each unit of the portable information terminal 1 based on the coordinate data and the contact/release signals.

The display control unit 5 controls the display panel 3a to display a guide region and a selection region as character input and image selection GUIs, which will be explained later in detail. In the guide region, a plurality of items having a predetermined arrangement are displayed in a predetermined arrangement. In the selection region, a series of items included in a specified range specified in the guide region is displayed in one line in a predetermined arrangement in an enlarged size larger than the size of the items displayed in the guide region.

When the specified range is moved in the guide region, the display control unit 5 controls the display panel 3a to display, in the selection region, a series of items included in the moved specified range in such a manner that the series of items is displayed in one line in a predetermined arrangement. When a series of items is scrolled in the selection region, the display control unit 5 controls the display panel 3a to update the display of the guide region so that a series of items displayed in the scrolled selection region is included in the specified range. Then, the control unit 6 determines selection of an item in response to a selection gesture given in the selection region.

[2. Application to Character Input GUI]

Subsequently, an embodiment of the present disclosure applied to a character input GUI will be explained with reference to FIGS. 3, 4, 5A to 5D, and 6.

Figure 3:
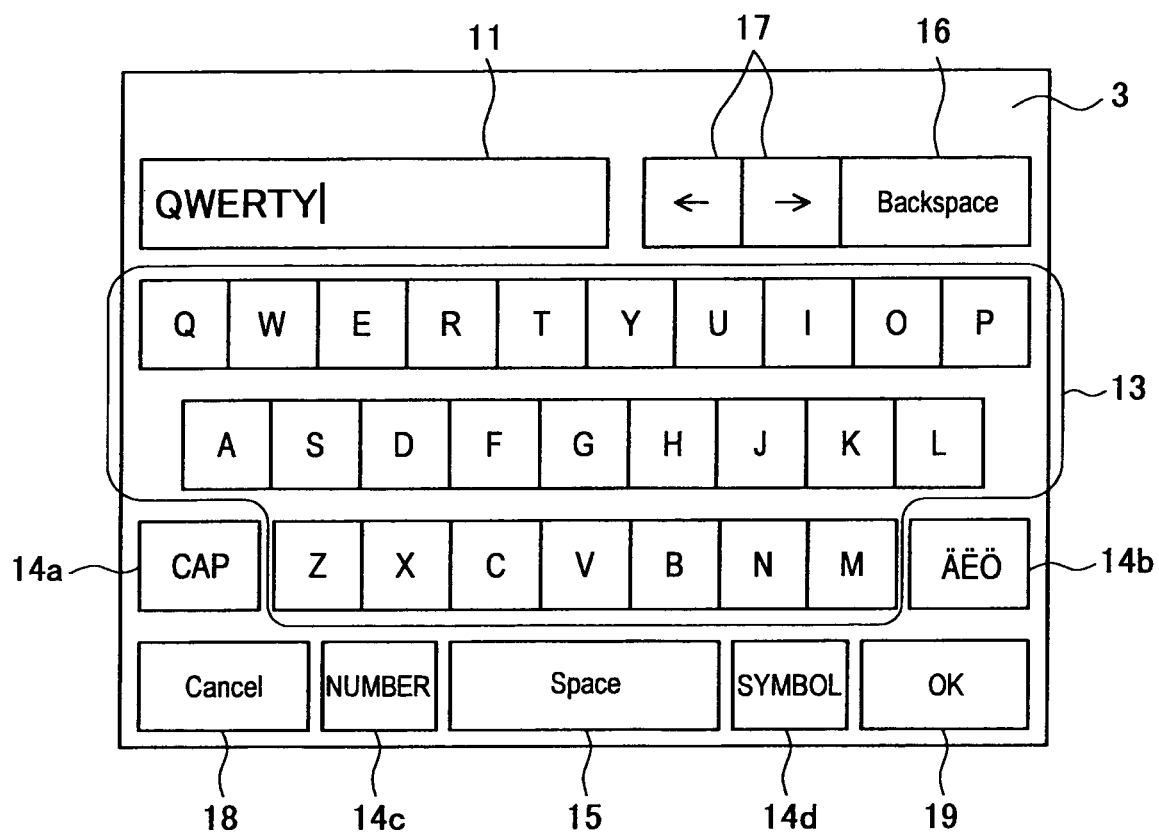
FIG. 3 is a figure illustrating an example of a generally-available character input GUI used in the related art.

FIG. 3 illustrates a software keyboard in QWERTY layout as an example of a generally-available character input GUI used in the related art. The GUI as shown in FIG. 3 has a character display region 11 as well as a key selection region other than the character display region 11.

The character display region 11 shows a character string including a series of characters selected from the key selection region (such as a character string, "QWERTY") and a cursor indicating a position to which a character is to be inserted (shown as "|"). The character selection region includes uppercase alphabet keys 13 ("A" to "Z"), character type selection keys 14 (a CAPS lock key 14a, a special character key 14b, a number key 14c, a symbol key 14d), a space key 15, a back space key 16, cursor keys 17, a cancel key 18, and an OK key 19, which are arranged in a predetermined arrangement.

In the GUI as shown in FIG. 3, a user inputs characters by tapping the character selection region. For example, when the CAPS lock key 14a is tapped to select an uppercase alphabet as the character type, the uppercase alphabet key 13 from "A" to "Z" are displayed in the character selection region as shown in FIG. 3. Then, when the key "A" is tapped, a character "A" is inserted to a cursor position in the character display region 11. When the number key 14c is tapped to select a number as the character type, number/symbol keys such as "0" to "9", ".", "/", "*", "−", "+", and the like are displayed in the character selection region. Then, when the key "0" is tapped, a character "0" is inserted to the cursor position in the character display region 11.

Figure 4:
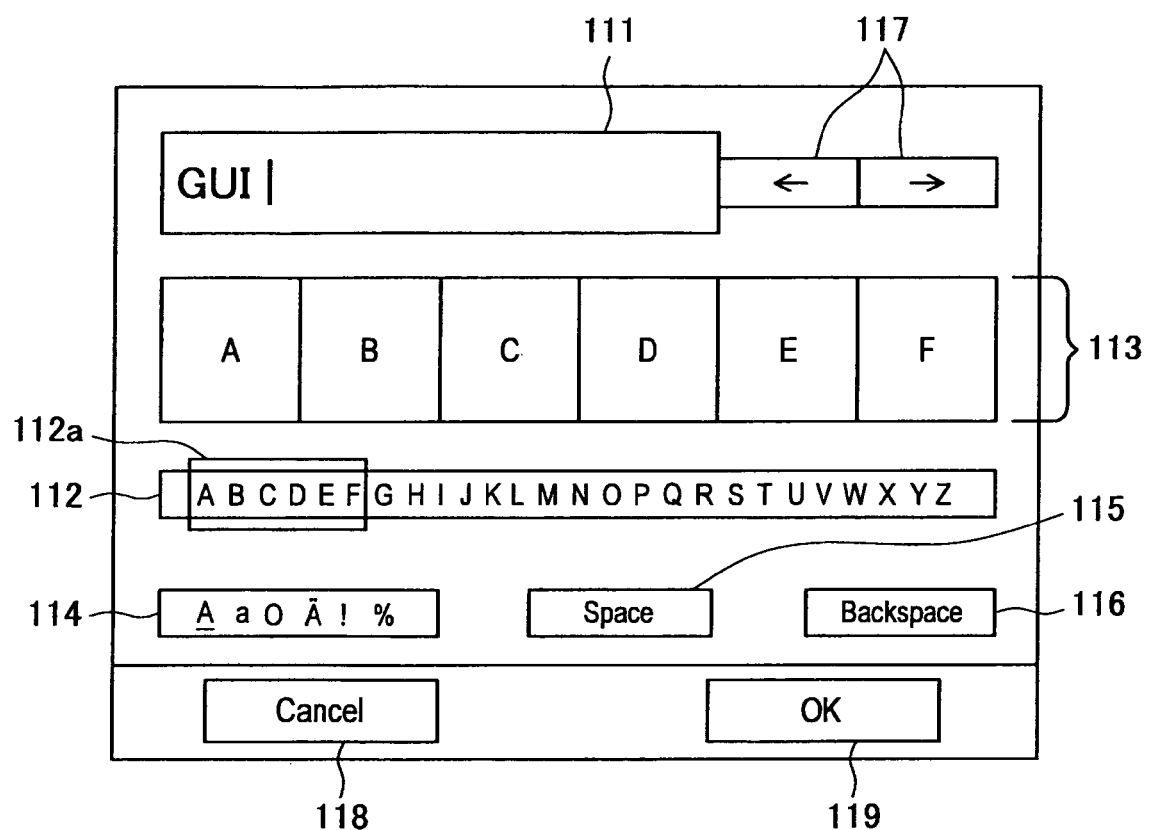
FIG. 4 is a figure illustrating an embodiment where the present disclosure is applied to a character input GUI.

FIG. 4 illustrates the character input GUI according to the embodiment of the present disclosure. The GUI as shown in FIG. 4 has a character display region 111 as well as a character selection region other than the character display region 111.

The character display region 111 shows a character string including a series of characters selected from the character selection region (such as a character string, "GU") and a cursor indicating a position to which a character is inserted (shown as "|"). In the character selection region, a guide region 112, a key selection region (selection region) 113, a character type selection key 114, a space key 115, a back space key 116, a cursor key 117, a cancel key 118, and an OK key 119 are displayed. The character type selection key 114 is used to switch the character type such as uppercase alphabets, lowercase alphabets, special characters, and numbers/symbols. Character types such as Japanese hiragana letters and Japanese katakana letters may also be added to the selectable characters types.

In a guide region 112, a plurality of items having a predetermined arrangement, i.e., a character string including a plurality of characters, are displayed in a predetermined arrangement in one line. In the guide region 112, a guide frame 112a is displayed to indicate a specified range specified in the guide region 112.

In the key selection region 113, a series of items specified by the guide frame 112a in the guide region 112, i.e., a series of characters, is displayed in one line in a predetermined arrangement in an enlarged size larger than the size of the items displayed in the guide region 112.

For example, when the character type selection key 114 is tapped to select an uppercase alphabet as the character type, the guide region 112 and the key selection region 113 are displayed as shown in FIG. 4. In the guide region 112, uppercase alphabets from "A" to "Z" are displayed in the alphabetical order. For example, the guide frame 112a is displayed to enclose the characters "A" to "F". In the key selection region 113, six keys respectively assigned to characters "A" to "F" specified by the guide frame 112a are enlarged and displayed in one line in the alphabetical order. The number of characters specified by the guide frame 112a is not limited to six. Two or more characters may be specified by the guide frame 112a.

When the character type selection key 114 is tapped to select a number as the character type, a display different from the display of FIG. 4 is shown in the guide region 112 and the key selection region 113. In the guide region 112, number/symbols such as "0" to "9", ".", "/", , "*", "−", and "+" are displayed in a predetermined order, and the guide frame 112a enclosing the characters "0" to "5" is displayed. In the key selection region 113, six keys respectively assigned to characters "0" to "5" specified by the guide frame 112a are enlarged and displayed in one line in ascending order of the numbers.

In the GUI shown in FIG. 4, characters are input using moving gesture given in the guide region 112 and tap gesture (and selective scroll gesture) given in the key selection region 113 as explained later.

When the space key 115 is tapped in the character display region 111, a space is inserted to the cursor position. When the back space key 116 is tapped, a character at the right side of the cursor position is erased. When the cursor key 117 is tapped, the cursor position moves. When the cancel key 118 is tapped, character input is cancelled, and input operation is terminated. When the OK key 119 is tapped, character input is entered, and input operation is terminated.

Figure 5:
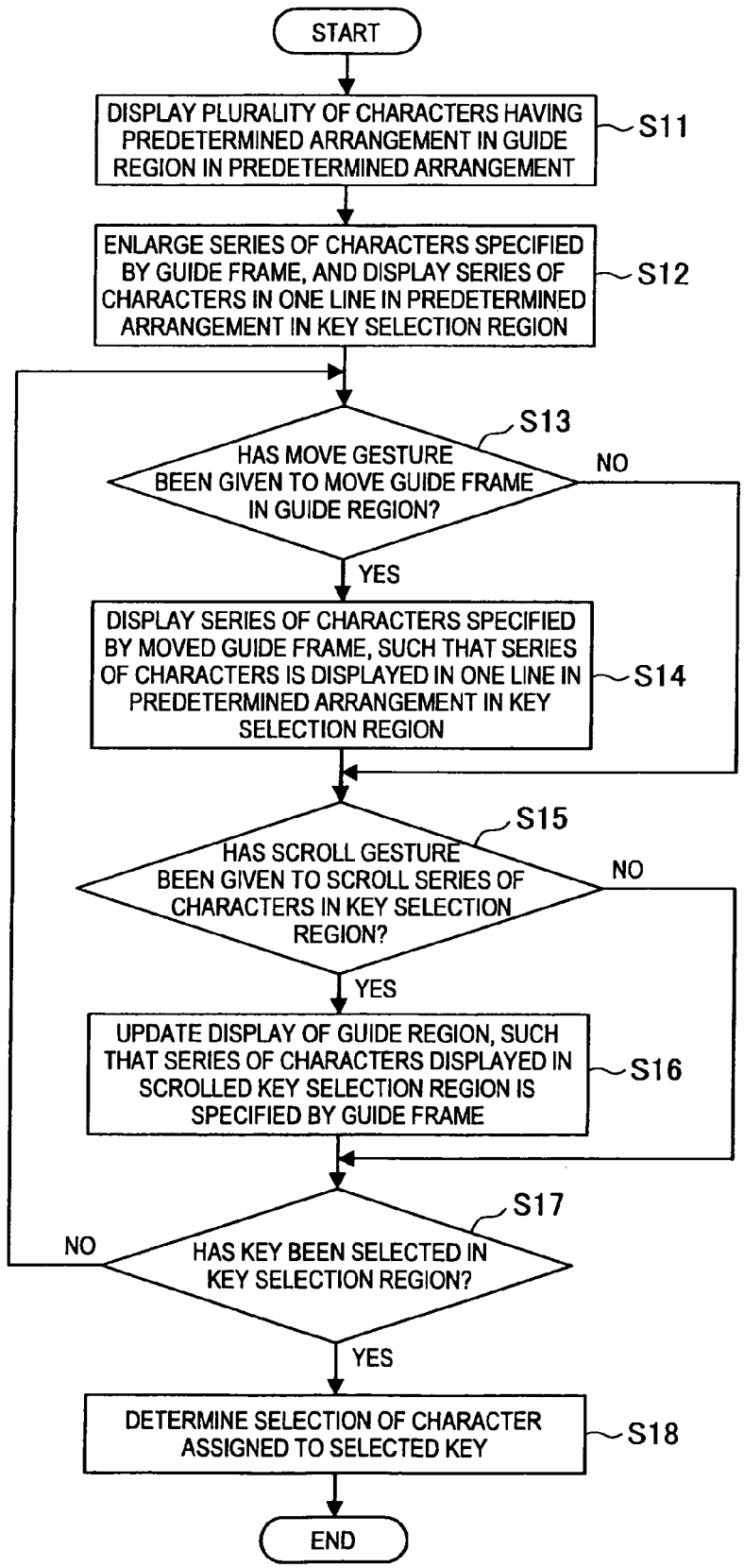
FIG. 5 is a flow diagram illustration an order of operation of the character input GUI.

FIG. 5 illustrates an order of operation of the character input GUI. As shown in FIG. 5, the display control unit 5 controls the, display panel 3a to display the guide region 112 and the key selection region 113 (steps S11, S12).

In the guide region 112, a character string having a predetermined arrangement is displayed in a predetermined arrangement. In the key selection region 113, a series of characters specified by the guide frame 112a in the guide region 112 is displayed in one line in a predetermined arrangement in an enlarged size larger than the size of the character string displayed in the guide region 112.

When scroll gesture is given in the guide region 112 to move the guide frame 112a (S13), the display control unit 5 controls the display panel 3a to display, in the key selection region 113, a plurality of characters specified by the guide frame 112a in such a manner that the plurality of characters are displayed in one line in a predetermined arrangement in synchronization with the movement of the guide frame 112a (S14).

When scroll gesture is given to a series of characters in the key selection region 113 (S15), the display control unit 5 controls the display panel 3a to update the display of the guide region 112 so that the series of characters displayed in the scrolled key selection region 113 is specified by the guide frame 112a (S16). Then, when tap gesture is given in the key selection region 113 (S17), the control unit 6 determines selection of the character assigned to the tapped key (S18).

An order of operation of the character input GUI shown in FIG. 4 will be hereinafter explained with reference to FIGS. 6A to 6D. FIGS. 6A to 6D are an example of operation of the character input GUI.

Figure 6A:
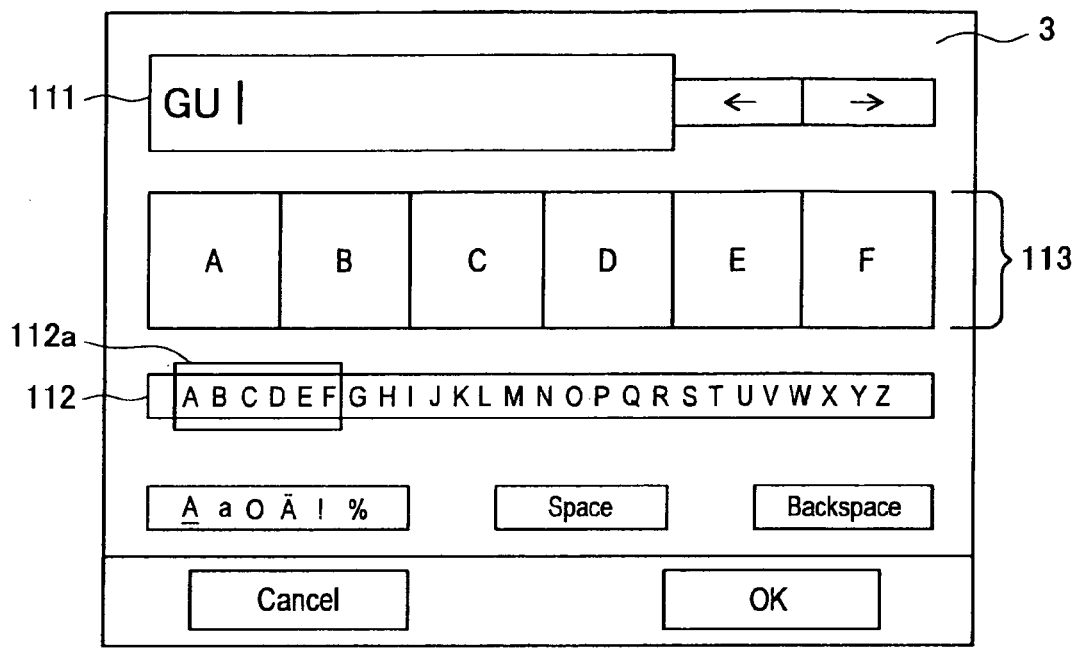
FIG. 6A is a figure (1/4) illustrating an example of operation of the character input GUI.

For example, when the character type selection key 114 is tapped to select an uppercase alphabet as the character type, characters "A" to "Z" are displayed in the alphabetical order in the guide region 112 as shown in FIG. 6A, and the guide frame 112a for specifying characters "A" to "F" is displayed. The guide frame 112a may be displayed at the position where it was when the uppercase alphabet was selected as the character type.

In the key selection region 113, six keys respectively assigned to characters "A" to "F" specified by the guide frame 112a are enlarged and displayed in one line in the alphabetical order. For example, the keys are displayed in the key selection region 113 in a size about twice as large as the keys displayed in the generally-available character input GUI as shown in FIG. 3.

The character type is selected by causing the touch panel 3b to detect tap gesture given to the character type selection key 114 and notify the detection result to the control unit 6. The guide region 112 and the key selection region 113 are displayed by causing the display control unit 5 to read predetermined display data from the storage unit 4 and perform predetermined display processing based on the selected character type.

Figure 6B:
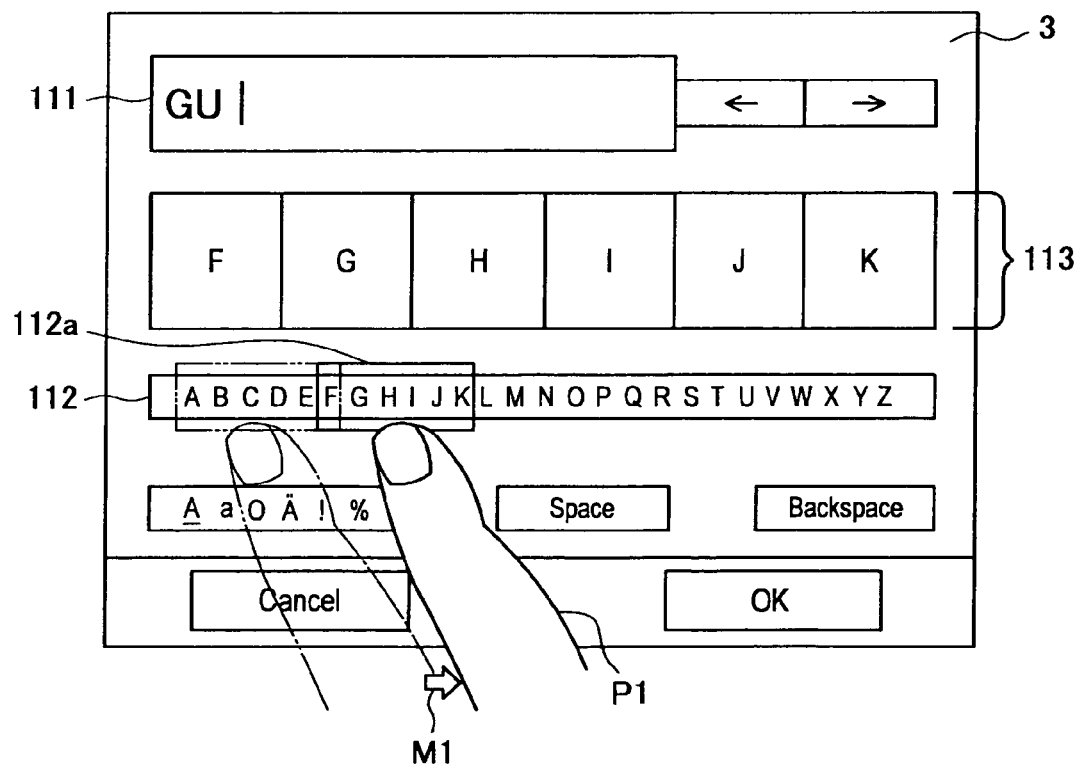
FIG. 6B is a figure (2/4) illustrating an example of operation of the character input GUI.

A user can give move gesture M1 in the guide region 112. When the finger P (for example, thumb P1) and the like brought into contact with the guide frame 112a is moved (M1) to the right or left in the guide region 112, the guide frame 112a moves to the right or left as shown in FIG. 6B. In other words, the guide frame 112a moves from a position indicated by a broken line to a position indicated by a solid line. Then, when the guide frame 112a moves, the keys specified by the guide frame 112a are enlarged and displayed in a predetermined arrangement in the key selection region 113. At this occasion, the move gesture M1 may be given as scroll gesture or may be given as tap gesture.

The move gesture M1 in the guide region 112 is performed by causing the touch panel 3b to detect move gesture of the guide region 112 (guide frame 112a) and notify the detection result to the control unit 6. The guide region 112 and the key selection region 113 are displayed by causing the display control unit 5 to read predetermined display data from the storage unit 4 and perform predetermined display processing based on the moved position of the finger P.

For example, when the guide frame 112*a* is moved in the guide region 112 from the position specifying the characters "A" to "F" to the position specifying the characters "F" to "K", the display of the keys corresponding to the characters "A" to "F" changes to the display of the keys corresponding to the characters "F" to "K" in the key selection region 113. More specifically, the display of the key selection region 113 changes in synchronization with the movement of the guide frame 112*a*.

Likewise, when the guide frame 112*a* is moved in the guide region 112 from the position specifying the characters "F" to "K" to the position specifying the characters "A" to "F", the display of the keys corresponding to the characters "F" to "K" changes to the display of the keys corresponding to the characters "A" to "F" in the key selection region 113.

At this occasion, the guide frame 112*a* may move with a predetermined acceleration according to scroll gesture. In this case, when a user quickly moves to the right or left the finger P and the like brought into contact with the guide frame 112*a*, the guide frame 112*a* moves to the right or left with a predetermined acceleration. The guide frame 112*a* quickly moves immediately after the scroll gesture is given. Thereafter, the guide frame 112*a* gradually decelerates, and stops at the destination according to the moving speed of the finger P.

Figure 6C:
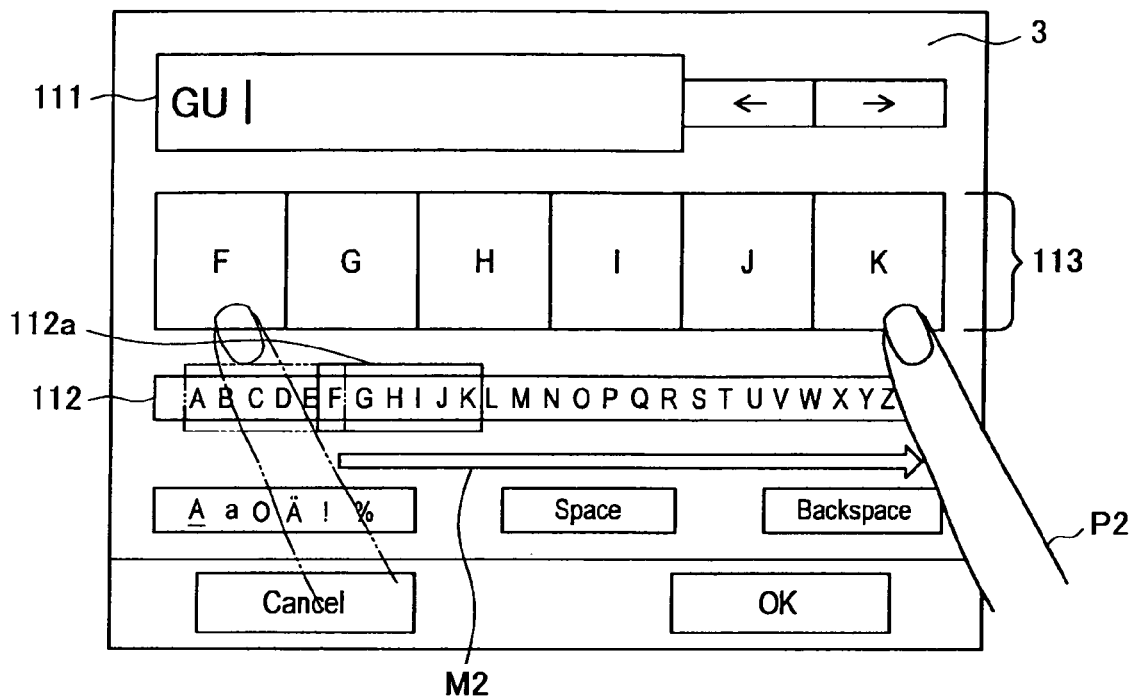
FIG. 6C is a figure (3/4) illustrating an example of operation of the character input GUI.

On the other hand, the user can also give scroll gesture M2 in the key selection region 113. When the finger P (for example, index finger P2) and the like brought into contact with a key is moved (M2) to the right or left in the key selection region 113, a series of keys scrolls to the right or left as shown in FIG. 6C. Then, in synchronization with the scrolled keys, the guide frame 112*a* moves in the guide region 112 in accordance with the series of keys displayed in the key selection region 113.

The scroll gesture M2 in the key selection region 113 is given by causing the touch panel 3*b* to detect scroll gesture given in the key selection region 113 and notify the detection result to the control unit 6. The guide region 112 and the key selection region 113 are displayed by causing the display control unit 5 to read predetermined display data from the storage unit 4 and perform predetermined display processing based on the moved position of the finger P.

For example, when scroll gesture is given to change the display of the keys corresponding to the characters "A" to "F" to the display of the keys corresponding to the characters "F" to "K" in the key selection region 113, the guide frame 112*a* moves from the position specifying the characters "A" to "F" to the position specifying the characters "F" to "K" in the guide region 112. More specifically, the guide frame 112*a* moves in synchronization with the scroll of the keys.

Likewise, when scroll gesture is given to change the display of the keys corresponding to the characters "F" to "K" to the display of the keys corresponding to the characters "A" to "F" in the key selection region 113, the guide frame 112*a* changes from the position specifying the characters "F" to "K" to the position specifying the characters "A" to "F" in the guide region 113.

At this occasion, the series of keys may also scroll with a predetermined acceleration according to scroll gesture. In this case, when a user quickly moves to the right or left the finger P and the like brought into contact with a key, the series of keys scrolls to the right or left with a predetermined acceleration. The series of keys quickly scrolls immediately after the scroll gesture is given. Thereafter, the series of keys gradually decelerates, and the scroll movement stops at the destination according to the moving speed of the finger P.

In this case, the move gesture M1 in the guide region 112 and the scroll gesture M2 in the key selection region 113 may be given immediately after one another. After the move gesture M1 is given in the guide region 112, the scroll gesture M2 may be given repeatedly in the key selection region 113.

Figure 6D:
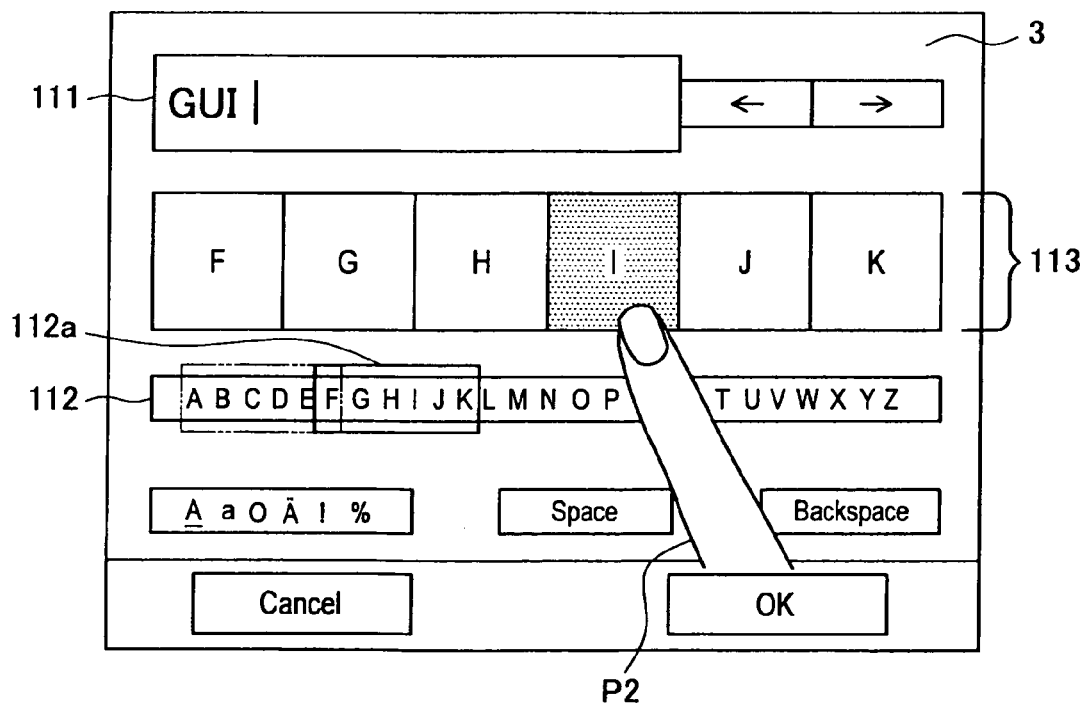
FIG. 6D is a figure (4/4) illustrating an example of operation of the character input GUI.

A user can give tap gesture in the key selection region 113. When a key is selected and touched by the finger P (for example, index finger P2) or the like, the display of the selected key, e.g., a key assigned to character "I", is changed in the key selection region 113 as shown in FIG. 6D. Then, when the finger P or the like is released from the panel surface, the character "I" assigned to the selected key is inserted to the cursor position in the character display region 111.

The key is selected by causing the touch panel 3*b* to detect tap gesture given to the key and notify the detection result to the control unit 6. The tapped key and the character display region 111 are displayed by causing the display control unit 5 to read predetermined display data from the storage unit 4 and perform predetermined display processing based on the selected key.

Accordingly, a user selects a character displayed in the key selection region 113 by moving the guide frame 112*a* in the guide region 112. Then, a character to be input is selected by selecting the character in the key selection region 113.

In the guide region 112, a plurality of characters having a predetermined arrangement are displayed in a predetermined arrangement. Therefore, even though the characters are displayed in a small size, the user can intuitively select a character to be displayed in the key selection region 113. In the key selection region 113, a series of characters specified by the guide frame 112*a* is enlarged and displayed in a predetermined arrangement. Therefore, the user can reliably select a desired character by finding and operating the character to be input.

Further, since a series of characters displayed in the key selection region 113 can be changed by giving the scroll gesture M2 in the key selection region 113, it is not necessary for the user to repeatedly give the move gesture M1 in the guide region 112 until a desired character is displayed in the key selection region 113. Still further, the display of the guide region 112 and the display of the key selection region 113 are synchronized with each other. Therefore, the ease of character input operation can be enhanced by successively giving the gestures M1, M2 in the guide region 112 and the key selection region 113.

In this case, for example, the user can give the move gesture M1 in the guide region 112 with the thumb P1, and can give tap gesture in the key selection region 113 with the index finger P2. Accordingly, a desired key can be selected in the key selection region 113 while the guide frame 112*a* moves in the guide region 112. Therefore, the ease of character input operation can be further enhanced.

Figure 7:
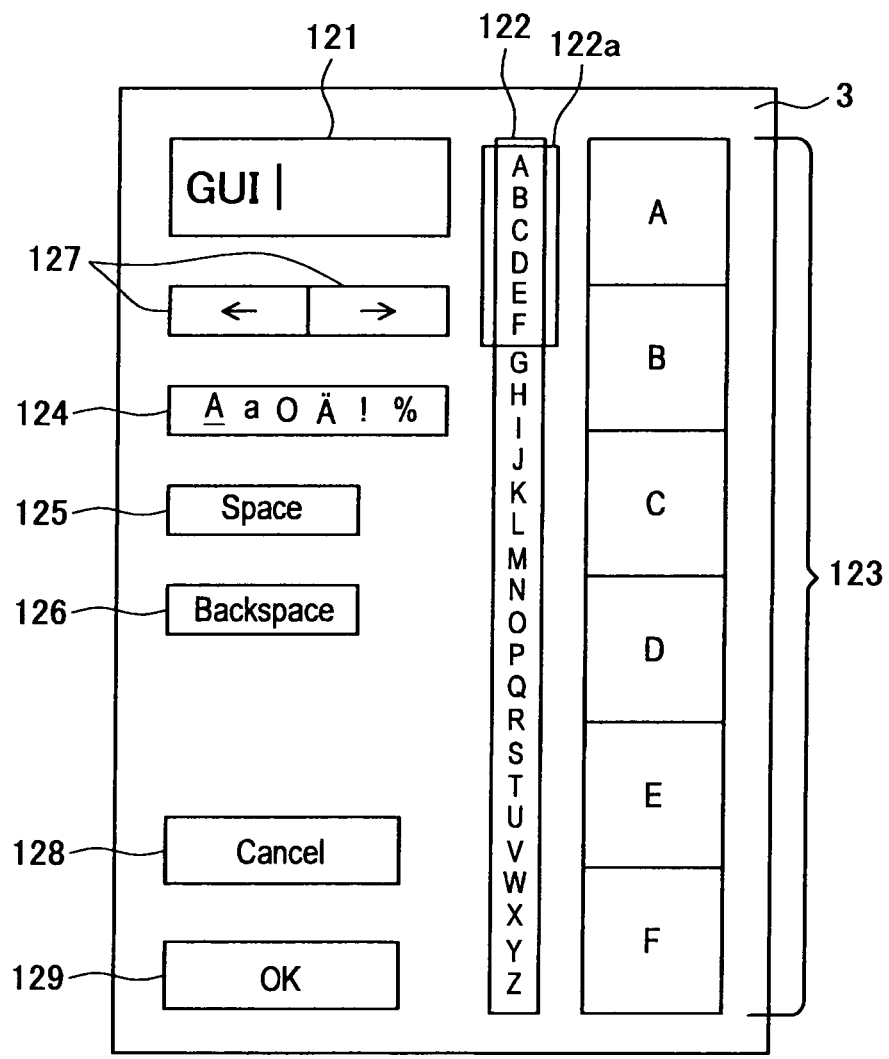
FIG. 7 is a figure illustrating another character input GUI.

FIG. 7 shows a modification of the character input GUI as shown in FIG. 4. In the example shown in FIG. 4, the guide region 112 and the key selection region 113 are arranged in parallel in the horizontal direction. However, a guide region 122 and a key selection region 123 may be arranged in parallel in the vertical direction as shown in FIG. 7. Alternatively, the guide region 112 may be arranged in the horizontal direction, and the key selection region 113 may be arranged in the vertical direction. Alternatively, they may be arranged in the opposite directions.

In the example shown in FIG. 4, the guide region 112 has one line. Alternatively, the guide region 112 may have two lines. In the example shown in FIG. 4, all the characters (such as "A" to "Z") that can be selected in a particular character type are displayed in the guide region 112. Alternatively, only some of the characters (such as "A" to "L") that can be selected in a particular character type are displayed in the guide region 112. In this case, when the guide frame 112a moves to a predetermined position in the guide region 112, other characters (such as "M" to "Z") may be displayed in the guide region 112.

[2. Application to Character Input GUI]

Subsequently, an embodiment of the present disclosure applied to an image selection GUI will be explained with reference to FIGS. 8 and 9A to 9D.

Figure 8:
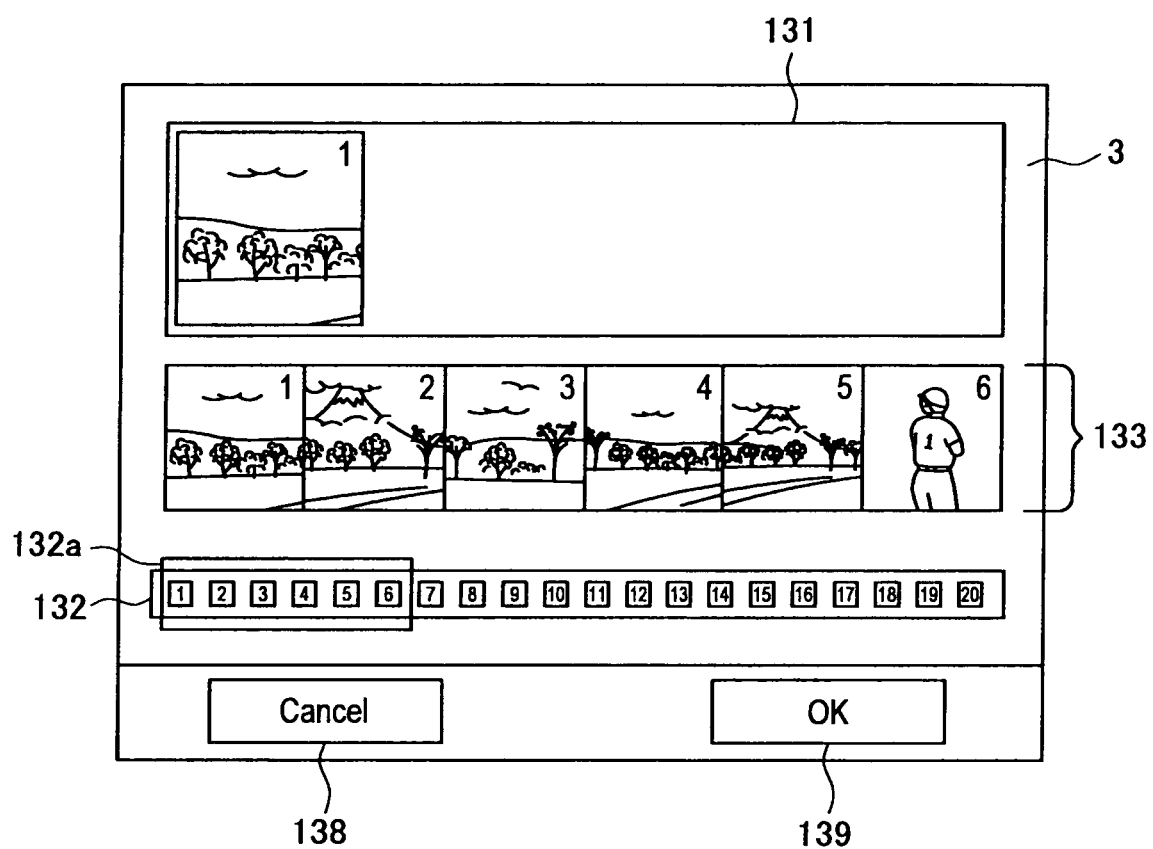
FIG. 8 is a figure illustrating an embodiment where the present disclosure is applied to an image selection GUI.

FIG. 8 illustrates the image selection GUI according to the embodiment of the present disclosure. The GUI shown in FIG. 8 has an image display region 131 as well as an image selection region other than the image display region 131.

In the image display region 131, an image (for example, image 1) selected in the image selection region is displayed. In the image selection region, a guide region (guide region) 132, a key selection region (selection region) 133, a cancel key 138, and an OK key 139 are displayed.

In the guide region 132, a plurality of items having a predetermined arrangement, i.e., an image sequence including a plurality of images, is displayed in a predetermined arrangement in one line. In the drawings, image numbers "1" to "20" are attached for the sake of convenience. In the guide region 132, a guide frame 132a is displayed to indicate a specified range specified in the guide region 132.

In the key selection region 133, a plurality of items specified by the guide frame 132a in the guide region 132, i.e., a plurality of images, is displayed in one line in a predetermined arrangement in an enlarged size larger than the size of the images displayed in the guide region 132.

For example, in the guide region 132, "image 1", "image 2", . . . , "image 20" are displayed in the order of shooting date. For example, the guide frame 132a is displayed to enclose "image 1" to "image 6". In the key selection region 133, six keys respectively assigned to "image 1" to "image 6" specified by the guide frame 132a are enlarged and displayed in one line in the order of shooting date. The images may be displayed in any order other than the order of shooting date as long as a user can recognize a predetermined arrangement.

In the GUI shown in FIG. 8, images are selected using moving gesture given in the guide region 132 and tap gesture (and selective scroll gesture) given in the key selection region 133 as explained later.

An order of operation of the image selection GUI shown in FIG. 8 will be hereinafter explained with reference to FIGS. 9A to 9D. FIGS. 9A to 9D are an example of operation of the image selection GUI.

Figure 9A:
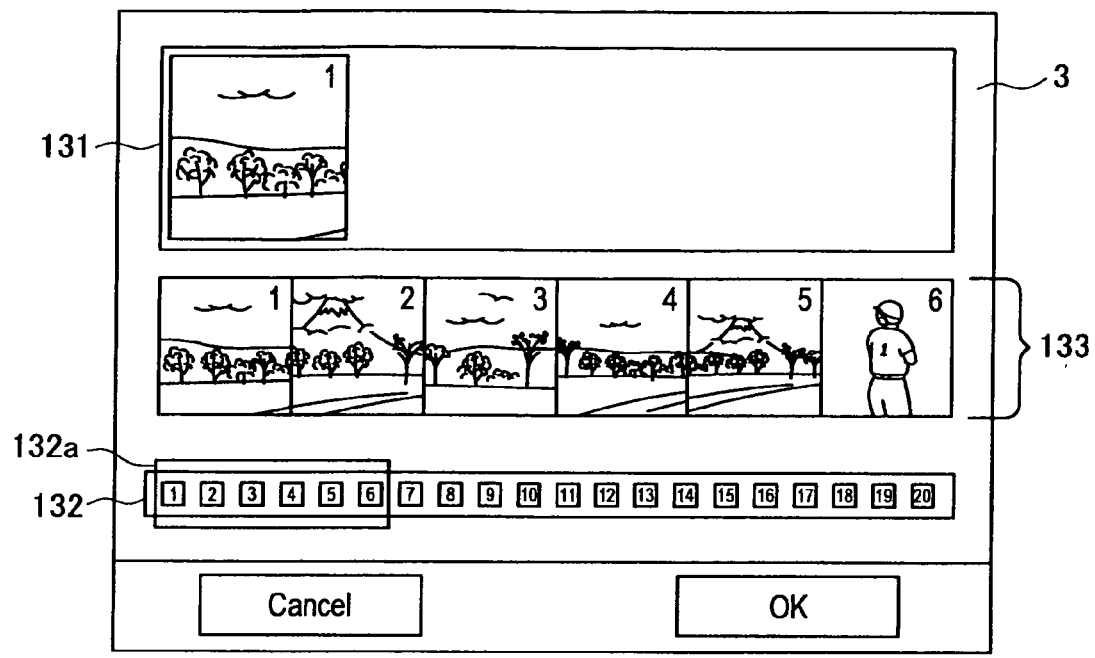
FIG. 9A is a figure (1/4) illustrating an example of operation of the image selection GUI.

As shown in FIG. 9A, "image 1", "image 2", . . . , "image 20" are displayed in the order of shooting date in the guide region 132, and the guide frame 132a is displayed to specify "image 1" to "image 6". In the key selection region 133, six keys respectively assigned to "image 1" to "image 6" specified by the guide frame 132a are enlarged and displayed in one line in the order of shooting date.

Figure 9B:
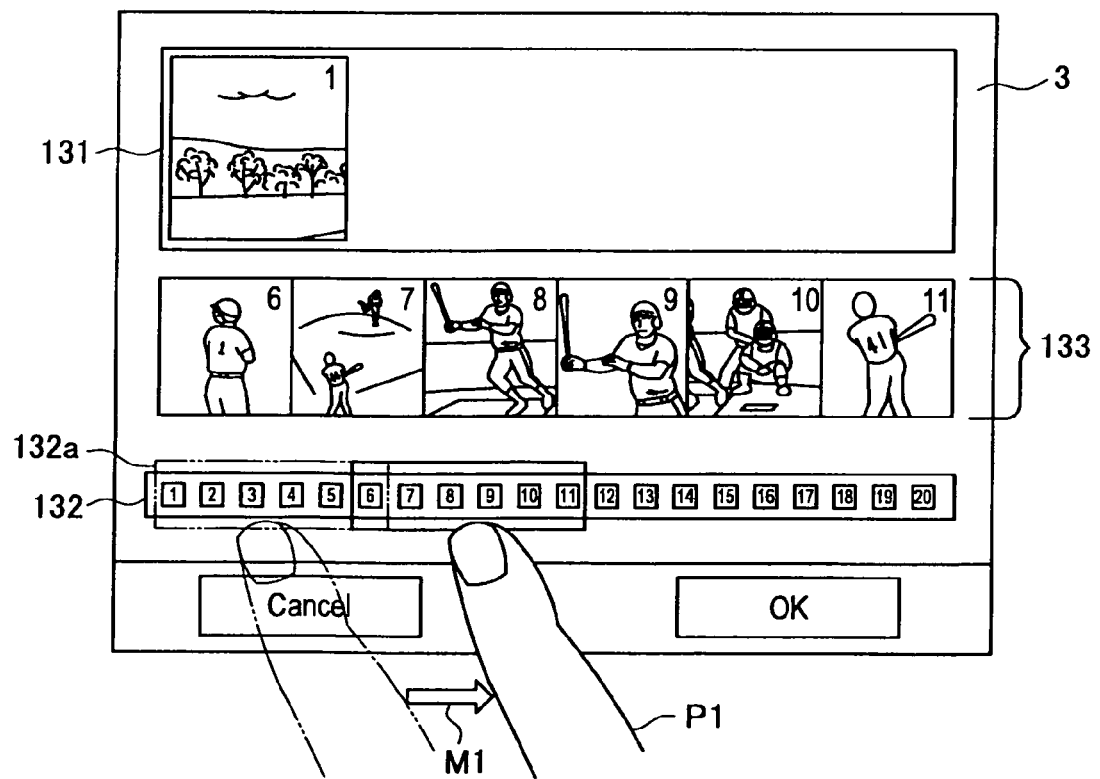
FIG. 9B is a figure (2/4) illustrating an example of operation of the image selection GUI.

A user can give move gesture M1 in the guide region 132. When a finger P (for example, thumb P1) or the like brought into contact with the guide frame 132a is moved (M1) to the right or left in the guide region 132, the guide frame 132a moves to the right or left as shown in FIG. 9B. Then, when the guide frame 132a moves, the images specified by the guide frame 132a is enlarged and displayed in a predetermined arrangement in the key selection region 133. At this occasion, the move gesture M1 may be given as scroll gesture, or may be given as tap gesture.

For example, when the guide frame 132a is moved in the guide region 132 from the position specifying "image 1" to "image 6" to the position specifying "image 6" to "image 11", the display of the keys corresponding to "image 1" to "image 6" changes to the display of the keys corresponding to "image 6" to "image 11" in the key selection region 133. More specifically, the display of the key selection region 133 changes in synchronization with the movement of the guide frame 132a.

Figure 9C:
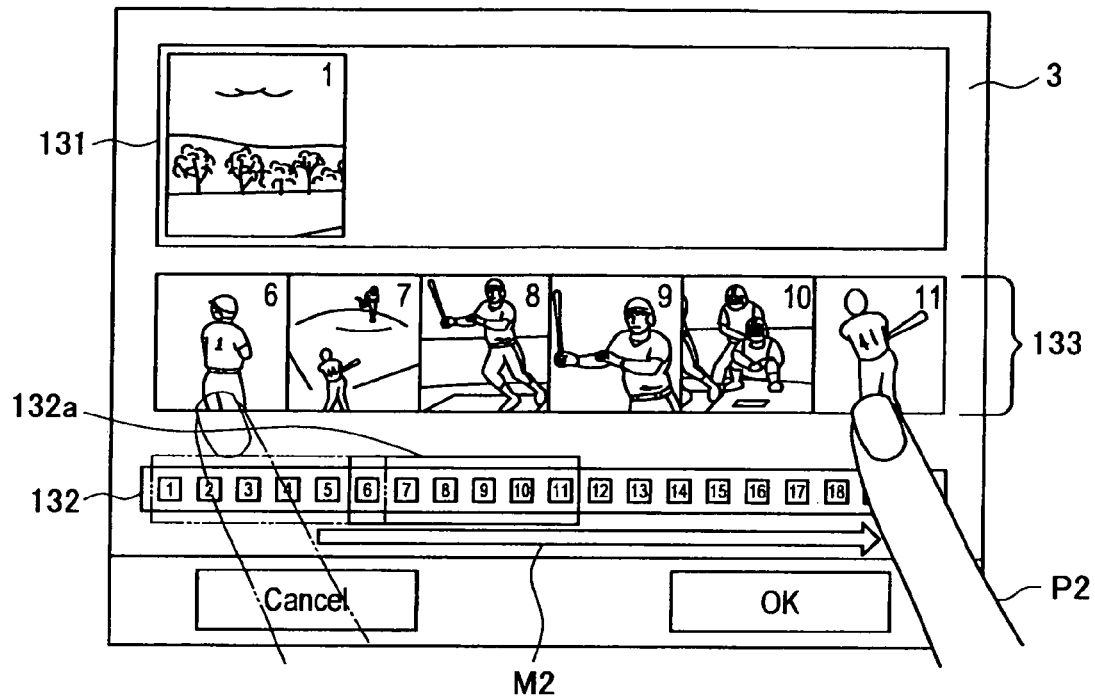
FIG. 9C is a figure (3/4) illustrating an example of operation of the image selection GUI.

On the other hand, the user can also give scroll gesture M2 in the key selection region 133. When the finger P (for example, index finger P2) or the like brought into contact with a key is moved (M2) to the right or left in the key selection region 133, a series of keys scrolls to the right or left as shown in FIG. 9C. Then, in synchronization with the scrolled keys, the guide frame 132a moves in the guide region 132 in accordance with the series of images displayed in the key selection region 133.

For example, when scroll gesture is given to change the display of the keys corresponding to "image 1" to "image 6"" to the display of the keys corresponding to "image 6" to "image 11" in the key selection region 133, the guide frame 132a moves from the position specifying "image 1" to "image 6" to the position specifying "image 6" to "image 11" in the guide region 132. More specifically, the guide frame 132a moves in synchronization with the scroll of the keys.

In this case, the move gesture M1 in the guide region 132 and the scroll gesture M2 in the key selection region 133 may be given immediately after one another. After the move gesture M1 is given in the guide region 132, the scroll gesture M2 may be given repeatedly in the key selection region 133.

Figure 9D:
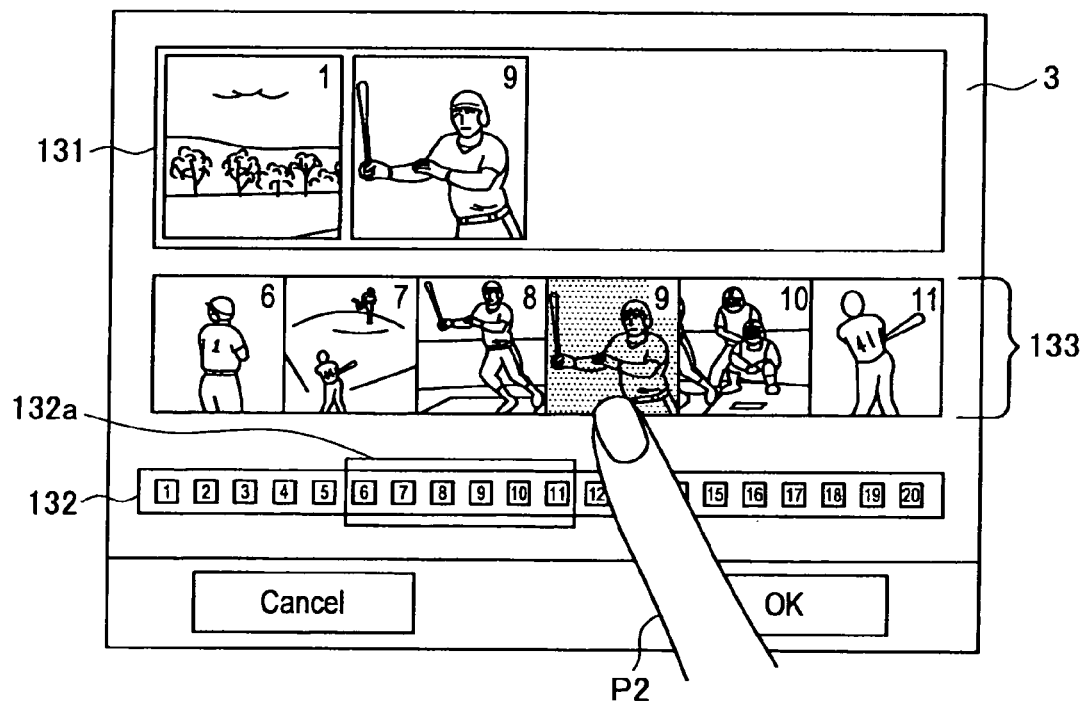
FIG. 9D is a figure (4/4) illustrating an example of operation of the image selection GUI.

A user can give tap gesture in the key selection region 133. When a key is selected and is touched by the finger P (for example, index finger P2), the display of the selected key, e.g., a key assigned to "image 9", is changed in the key selection region 133 as shown in FIG. 9D. Then, when the finger P or the like is released from the panel surface, "image 9" assigned to the selected key is displayed in the image display region 131.

Accordingly, a user selects an image displayed in the key selection region 133 by moving the guide frame 132a in the guide region 132. Then, the user selects an image in the key selection region 133, thus selecting an image to be selected.

In the guide region 132, a plurality of images having a predetermined arrangement is displayed in a predetermined arrangement. Therefore, even though the images are displayed in a small size, the user can intuitively select an image to be displayed in the key selection region 133. In the key selection region 133, a series of images specified by the guide frame 132a is enlarged and displayed in a predetermined arrangement. Therefore, the user can reliably select a desired image by finding and operating the image to be selected.

Further, since a series of images displayed in the key selection region 133 can be changed by giving the scroll gesture M2 in the key selection region 133, it is not necessary for the user to repeatedly give the move gesture M1 in the guide region 132 until a desired image is displayed in the key selection region 133. Still further, the display of the guide region 132 and the display of the key selection region 133 are synchronized with each other. Therefore, the ease of image selection operation can be enhanced by successively giving the gestures M1, M2 in the guide region 132 and the key selection region 133.

Although preferred embodiments of the disclosure are described in detail above with reference to the appended drawings, the disclosure is not limited thereto. It should be understood by those skilled in the art that various modifications, combinations, sub-combinations and alterations may occur depending on design requirements and other factors insofar as they are within the scope of the appended claims or the equivalents thereof.

For example, in the above explanation, the present disclosure is applied to the portable information terminal 1 having the small touch panel display 3. However, the present disclosure can also be applied to electronic apparatuses such as an audio apparatus and a home electronic appliance having the small touch panel display 3 in the same manner.

In the above explanation, the GUI for character input and image selection is displayed on the entire surface of the touch panel display 3. Alternatively, the GUI for character input and image selection may be displayed only in some area of the touch panel display 3.

The present application contains subject matter related to that disclosed in Japanese Priority Patent Application JP 2010-131349 filed in the Japan Patent Office on Jun. 8, 2010, the entire content of which is hereby incorporated by reference.

What is claimed is:

1. An information processing apparatus comprising:
    a display unit configured to:
        display simultaneously a guide region, a selection region, and a display region;
        display a plurality of items according to a predetermined arrangement in the guide region,
        display a series of items identified by a guide frame configured on the guide region from the plurality of items in the selection region according to the predetermined arrangement, and
        display selected items in the display region;
    a display controller configured to:
        control the display unit in response to a move command received in the guide region, the move command configured to specify a location of the guide frame on the guide region,
        update the series if items identified by the guide frame displayed in the selection region based on the location of the guide frame as specified by the move command,
        update the location of the guide frame on the guide region in response to a scroll command received in the selection region; and
    a control unit, configured to determine an item selection in accordance with a selection command received in the selection region to generate the selected items displayed by the display unit in the display region.

2. The information processing apparatus according to claim 1, wherein the display unit is configured to arrange the guide region and the selection region so that the move command received in the guide region and the selection command received in the selection region are generated by detecting a touch command.

3. The information processing apparatus according to claim 1, wherein the move command is a scroll command.

4. The information processing apparatus according to claim 1, wherein the display unit is configured to enlarge the plurality of items identified by the guide frame to generate the series of items displayed in the selection region.

5. The information processing apparatus to claim 1, wherein the display unit is configured to update and display the series of items in synchronization with the location of the guide frame as specified by the move command.

6. The information processing apparatus according to claim 1, wherein the display unit is configured to display the series of items in the selection region in a linear format.

7. An information processing method comprising:
    displaying simultaneously a guide region, a selection region, and a display region;
    displaying a plurality of items according to a predetermined arrangement in the guide region;
    displaying a guide frame on the guide region, the guide frame identifying a series of items from the plurality of items;
    displaying in the selection region the series of items according to the predetermined arrangement;
    receiving a move command in the guide region specifying a location of the guide frame on the guide region;
    updating the series of items identified by the guide frame based on the location of the guide frame as specified by the move command;
    updating the location of the guide frame on the guide region in response to a scroll command received in the selection region; and
    determining an item selection in accordance with receiving a selection command in the selection region to generate a set of selected items; and
    displaying selected items in the display region.

8. The information process method to claim 7, further comprising arranging the guide region and the selection region so that the move command received in the guide region and the selection command received in the selection region are generated by detecting a touch command.

9. The information processing method according to claim 7, wherein the move command is a scroll command.

10. The information processing method according to claim 7, further comprising enlarging the plurality of items identified by the guide frame to generate the series of items displayed in the selection region.

11. The information processing method according to claim 7, further comprising updating and displaying the series of items in synchronization with the location of the guide frame as specified by the move command.

12. The information processing method according to claim 7, further comprising displaying the series of items in the selected region in a linear format.

13. A non-transitory computer readable medium storing program code for processing information, the program code being executable by a processor to perform operations comprising:
    displaying simultaneously a guide region, a selection region, and a display region;
    displaying a plurality of items according to a predetermined arrangement in the guide region;
    displaying a guide frame on the guide region, the guide frame identifying a series of items from the plurality of items;
    displaying in the selection region the series of items according to the predetermined arrangement;
    receiving a move command in the guide region specifying a location of the guide frame on the guide region;
    updating the series of items identified by the guide frame based on the location of the guide frame as specified by the move command;
    updating the location of the guide frame on the guide region in response to a scroll command received in the selection region; and
    determining an item selection in accordance with receiving a selection command in the selection region to generate a set of selected items; and
    displaying selected items in the display region.

14. The information processing apparatus according to claim 1, wherein the selection region is a key selection region that displays a key for each item of the series of items identified by a guide frame, where each key is assigned to each item specified by the guide frame.

15. The information processing apparatus according to claim 1, wherein
   the control generates a selection order for the selected items based in when the selection command that corresponds to that selected item is received, and
   the display region displays the selected items in accordance with the selection order.

16. The information processing apparatus according to claim 1, wherein the display region retains each selected items in order of selection while the location of the guide frame on the guide region changes to a second location and the series of items identified by the guide frame is updated in accordance with the second location.

17. The information processing apparatus according to claim 1, wherein the guide region is a character guide region that displays a series of characters configured to represent one of the plurality of items.

* * * * *